US012785818B2

(12) United States Patent
Sysak et al.

(10) Patent No.: US 12,785,818 B2
(45) Date of Patent: Nov. 3, 2026

(54) SYSTEMS AND METHODS FOR REMOTE OPTICAL POWER SUPPLY COMMUNICATION FOR UNCOOLED WDM OPTICAL LINKS

(71) Applicant: Ayar Labs, Inc., Santa Clara, CA (US)

(72) Inventors: Matthew Sysak, Sunnyvale, CA (US); Chen Sun, Berkeley, CA (US); Shahab Ardalan, Santa Clara, CA (US); Daniel Jeong, Santa Clara, CA (US); Songtao Liu, Santa Clara, CA (US)

(73) Assignee: Ayar Labs, Inc., San Jose, CA (US)

( * ) Notice: Subject to any disclaimer, the term of this patent is extended or adjusted under 35 U.S.C. 154(b) by 455 days.

(21) Appl. No.: 18/152,461

(22) Filed: Jan. 10, 2023

(65) Prior Publication Data

US 2023/0224047 A1 Jul. 13, 2023

Related U.S. Application Data

(60) Provisional application No. 63/298,519, filed on Jan. 11, 2022.

(51) Int. Cl.
*H04B 10/80* (2013.01)

(52) U.S. Cl.
CPC .................................. *H04B 10/806* (2013.01)

(58) Field of Classification Search
CPC .......... H04B 10/07955; H04B 10/0795; H04B 10/564; H04B 10/0799; H04B 10/0775; H04B 10/50575; H04B 10/506
See application file for complete search history.

(56) References Cited

U.S. PATENT DOCUMENTS 5,801,860 A * 9/1998 Yoneyama .......... H04J 14/0221 398/94
5,912,749 A * 6/1999 Harstead ............. H04J 14/0247 398/1

(Continued)

OTHER PUBLICATIONS

"Analog." 2006. In High Definition: A-Z Guide to Personal Technology, 1st ed. Houghton Mifflin. https://search.credoreference.com/articles/Qm9va0FydGljbGU6MTc2NjYxNA==?aid=279753.(Year: 2006).*

(Continued)

*Primary Examiner* — Tanya T Motsinger
(74) *Attorney, Agent, or Firm* — Charles Shemwell

(57) ABSTRACT

An optical power supply includes a plurality of lasers in a laser array. Each of the plurality of lasers is configured to generate a separate beam of continuous wave laser light. The optical power supply includes a temperature sensor that acquires a temperature associated with the laser array. The optical power supply includes a digital controller that receives notification of the temperature from the temperature senor. The optical power supply includes an optical power adjuster controlled by the digital controller. The optical power adjuster adjusts an optical power level of one or more beams of continuous wave laser light generated by the plurality of lasers to produce an optical power encoding that conveys information about the temperature associated with the laser array as acquired by the temperature sensor. An electro-optic chip receives the beams of continuous wave laser light from the optical power supply and decodes the optical power encoding.

26 Claims, 5 Drawing Sheets

(56) References Cited

U.S. PATENT DOCUMENTS 6,356,774 B1 3/2002 Bernstein et al.
6,389,046 B1 * 5/2002 Stayt, Jr. ............. H01S 5/06832 372/38.1
6,819,879 B1 * 11/2004 Wan ................... H04B 10/5561 398/183
6,996,142 B2 * 2/2006 Kai ....................... H01S 5/4031 372/68
7,359,643 B2 * 4/2008 Aronson ................ H04B 10/40 398/136
7,505,683 B1 * 3/2009 Lemieux ............. H04J 14/0241 398/4
8,027,591 B2 * 9/2011 Maryfield ............... G02F 1/017 398/107
8,275,011 B2 * 9/2012 Arai .................... H01S 5/06804 372/34
8,306,426 B2 * 11/2012 Minato ................. H04J 14/005 398/33
8,358,934 B2 * 1/2013 Hinderthuer ....... H04Q 11/0005 398/141
8,532,482 B2 * 9/2013 Yang .................. H04B 10/0791 398/24
8,687,969 B2 * 4/2014 Ekkizogloy ............ H04B 10/40 398/139
8,699,533 B1 * 4/2014 Wach .................. H01S 5/02212 372/34
9,667,022 B1 * 5/2017 Burkholder ........... H01S 3/0941
10,439,726 B1 * 10/2019 Mazzini ............. H04B 10/2589
2002/0049434 A1 * 4/2002 Teichmann ............ A61B 18/20 606/10
2003/0030919 A1 * 2/2003 Pezeshki ............ G02B 26/0841 359/726
2004/0228637 A1 * 11/2004 Lee ...................... H04B 10/505 398/183
2005/0213966 A1 * 9/2005 Chown ............. H04J 14/02216 398/27
2006/0044910 A1 * 3/2006 Chang ............... G11C 11/40626 365/222
2006/0153256 A1 * 7/2006 Sanchez .................. H01S 5/042 372/34
2006/0233968 A1 * 10/2006 Ohkawa .................. C23C 14/28 118/726
2006/0245753 A1 11/2006 Hurt et al.
2008/0013151 A1 1/2008 Draper
2008/0165815 A1 * 7/2008 Kamijima ................. H01S 5/14 372/34
2009/0016715 A1 1/2009 Furey
2009/0154918 A1 * 6/2009 Hinderthuer ....... H04Q 11/0005 398/43
2011/0298765 A1 * 12/2011 Butler .................. G09G 3/3208 345/207
2011/0298844 A1 * 12/2011 Butler ...................... G09G 3/02 345/690
2012/0288279 A1 * 11/2012 Zhang ................ H04Q 11/0067 398/182
2013/0343752 A1 * 12/2013 Graves ............... H04Q 11/0005 398/38
2014/0241726 A1 8/2014 Ho et al.
2014/0362890 A1 * 12/2014 Qian ...................... G01K 13/20 374/163
2015/0171963 A1 * 6/2015 Bhoja .................. H04B 10/564 398/115
2015/0341252 A1 * 11/2015 Felgate .............. H04B 10/0795 398/38
2016/0306622 A1 * 10/2016 Kim ................... H04B 10/1141
2020/0403703 A1 12/2020 Sun et al.
2021/0080546 A1 * 3/2021 O'Connor ............. G01S 7/4813
2021/0359766 A1 11/2021 Sysak et al.
2022/0069829 A1 * 3/2022 Seyedi .................. H03L 7/0995
2023/0224047 A1 * 7/2023 Sysak .................. H04B 10/564 398/171
2025/0009167 A1 * 1/2025 Yang ................... A47J 36/2433

OTHER PUBLICATIONS

Collin, S. M. H., ed. 2010. "Magnitude." In Dictionary of Computing, 6th ed. Bloomsbury. https://search.credoreference.com/articles/Qm9va0FydGljbGU6MzkzNzMwMw==?aid=279753. (Year: 2010).*

PCT Application No. PCT/US2023/010491, International Search Report and Written Opinion, Mailed on Apr. 14, 2023, 10 pages.

* cited by examiner

SYSTEMS AND METHODS FOR REMOTE OPTICAL POWER SUPPLY COMMUNICATION FOR UNCOOLED WDM OPTICAL LINKS

CROSS-REFERENCE TO RELATED APPLICATIONS

This application claims priority under 35 U.S.C. 119 to U.S. Provisional Patent Application No. 63/298,519, filed on Jan. 11, 2022, the disclosure of which is incorporated herein by reference in its entirety for all purposes.

BACKGROUND OF THE INVENTION

1. Field of the Invention

The disclosed embodiments relate to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for conveying optical signals, coupling optical signals between optical waveguides, modulating optical signals, and receiving optical signals. It is within this context that the disclosed embodiments arise.

SUMMARY OF THE INVENTION

In an example embodiment, an optical power supply is disclosed. The optical power supply includes a laser array that includes a plurality of lasers. Each of the plurality of lasers is configured to generate a separate beam of continuous wave laser light. The optical power supply also includes a temperature sensor configured to acquire a temperature associated with the laser array. The optical power supply also includes a digital controller configured to receive notification of the temperature from the temperature senor. The optical power supply also includes an optical power adjuster controlled by the digital controller. The optical power adjuster is configured to adjust an optical power level of one or more beams of continuous wave laser light generated by the plurality of lasers to produce an optical power encoding that conveys information about the temperature associated with the laser array as acquired by the temperature sensor.

In an example embodiment, an optical data communication system is disclosed. The optical data communication system includes an optical power supply configured to generate and output a plurality of continuous wave laser light beams. The optical power supply is configured to impart an optical power encoding across the plurality of continuous wave laser light beams. The optical power encoding conveys information about the optical power supply. The optical data communication system also includes an electro-optic chip optically connected to receive the plurality of continuous wave laser light beams having the optical power encoding as output by the optical power supply. The electro-optic chip is configured to decode the optical power encoding to obtain the information about the optical power supply as conveyed in the optical power encoding. The electro-optic chip is configured to use the plurality of continuous wave laser light beams as source light for generation of modulated optical signals.

In an example embodiment, a method is disclosed for data communication between an optical power supply and an electro-optic chip. The method includes generating a plurality of continuous wave laser light beams at an optical power supply that is remote from an electro-optic chip. The method also includes adjusting an optical power level of one or more of the plurality of continuous wave laser light beams at the optical power supply to impart an optical power encoding across the plurality of continuous wave laser light beams. The method also includes conveying the plurality of continuous wave laser light beams that have the optical power encoding from the optical power supply to the electro-optic chip. The method also includes detecting the optical power level of each of the plurality of continuous wave laser light beams at the electro-optic chip to identify the optical power encoding. The method also includes determining information represented by the optical power encoding at the electro-optic chip.

In an example embodiment, a method is disclosed for data communication between an optical power supply and an electro-optic chip. The method includes generating a plurality of continuous wave laser light beams at an optical power supply that is remote from an electro-optic chip. At least one of the plurality of continuous wave laser light beams is generated differently than others of the plurality of continuous wave laser light beams in order to provide information about the optical power supply. The method also includes conveying the plurality of continuous wave laser light beams to the electro-optic chip. The method also includes detecting the at least one of the plurality of continuous wave laser light beams that is different than others of the plurality of continuous wave laser light beams in order to determine the information that is provided about the optical power supply.

Other aspects and advantages of the disclosed embodiments will become more apparent from the following detailed description, taken in conjunction with the accompanying drawings, illustrating by way of example the disclosed embodiments.

DETAILED DESCRIPTION OF THE INVENTION

Figure 1:
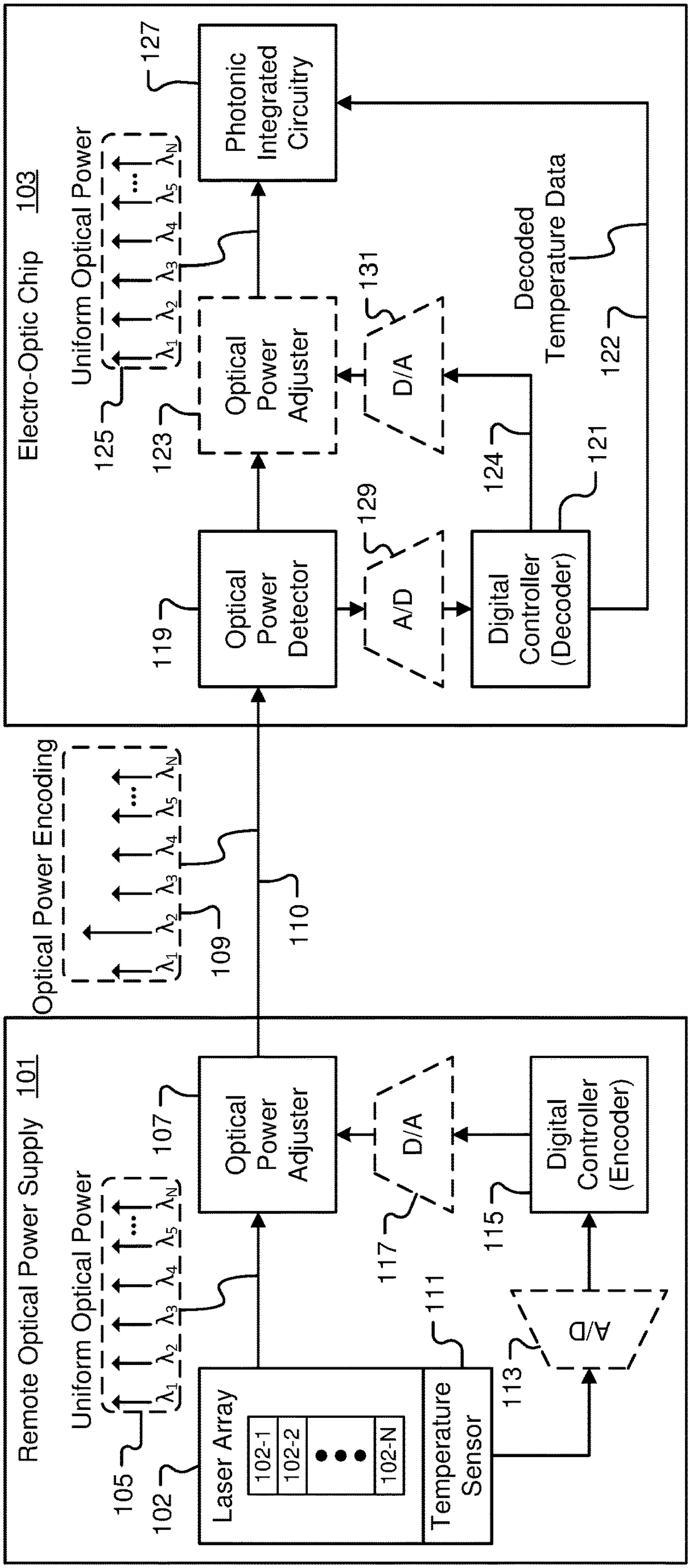
FIG. 1 shows an example system for unidirectional data communication from a remote optical power supply to an electro-optic chip, in accordance with some embodiments.

In the following description, numerous specific details are set forth in order to provide an understanding of the disclosed embodiments. It will be apparent, however, to one skilled in the art that the disclosed embodiments may be practiced without some or all of these specific details. In other instances, well known process operations have not been described in detail in order not to unnecessarily obscure the disclosed embodiments.

High-bandwidth, multi-wavelength WDM (wavelength division multiplexing) optical data communication systems are used to meet the needs of increasing interconnect data communication bandwidth requirements. In some implementations of high-bandwidth, multi-wavelength WDM optical data communication systems, a remote laser array configured to output a number N of wavelengths of continuous wave light (such as described in U.S. Pat. No. 10,135,218, which is incorporated herein by reference in its entirety for all purposes) is combined with an optical distribution network to produce multiple wavelength combinations of continuous wave light across many optical supply ports for transmission to an electro-optic chip. In some embodiments, the electro-optic chip is a CMOS (complementary metal-oxide-semiconductor) chip. In some embodiments, the electro-optic chip is a SOI (silicon-on-insulator) chip. In some embodiments, the electro-optic chip is the TeraPHY™ chip provided by Ayar Labs, Inc, such as described in U.S. patent application Ser. No. 17/184,537, which is incorporated herein by reference in its entirety for all purposes. However, it should be understood that the electro-optic chip referred to herein can be any type of photonic/electronic chip that sends and receives data.

Co-packaged optics (CPO) are being implemented within data centers and high performance computing (HPC) systems. Many CPO configurations utilize external laser light sources (remote optical power supplies) to improve the system's overall yield and reliability. In some situations, the remote optical power supplies are quite remote (up to 2 kilometers or more away) from the electro-optic chip(s) to which they supply laser light. It should be understood that the systems and methods disclosed herein provide an effective way for establishing data communication between the remote optical power supplies and the electro-optic chip(s) to which they supply laser light.

Embodiments are described herein for systems and methods for communicating information (data) from a remote optical power supply (e.g., WDM laser source) to an electro-optic chip, and vice-versa. Setting up this data communication is important especially at the communication link startup where the temperature of the remote optical power supply is unknown relative to the electro-optic chip. When the communication link between the remote optical power supply and the electro-optic chip is initiated, the electro-optic chip is typically driven to its highest ring resonator (or ring modulator) tuning power and highest temperature. If the remote optical power supply is at a low temperature during this communication link startup phase and the ring resonator (or ring modulator) operational wavelength lock is completed, when the remote optical power supply temperature subsequently increases, the ring resonator (or ring modulator) operational wavelength locking will be lost because there is no more wavelength tuning range for the ring resonator (or ring modulator) on the electro-optic chip. To manage the unknown temperature and relevant chip operational condition changes of both the remote optical power supply and electro-optic chip, systems and methods are described herein in which the remote optical power supply is able to communicate with the electro-optic chip, either unidirectionally or bidirectionally, to provide for exchange of condition information (data), e.g., temperature information (data), between the remote optical power supply and the electro-optic chip.

A system configuration is disclosed herein that provides for remote optical power supply (e.g., WDM laser source) data communication with the electro-optic chip, to support modulation and transmission of light signals between processors, such as between central processing units (CPUs) and/or graphics processing units (GPUs) and/or any other type of computer processor(s). In various embodiments, light signals from the laser array of the remote optical power supply are embedded (encoded and/or modulated) with data that conveys the temperature or relevant chip operation information about the remote optical power supply. The light signals having data embedded and/or modulated therein are then transmitted from the laser array to the electro-optic chip to provide for information exchange.

In some embodiments, for unidirectional data communication from the remote optical power supply to the electro-optic chip, the intensity (optical power level) of each light signal from the laser array of the remote optical power supply is digitized to convey a digital data pattern for detection by the receiver side at the electro-optic chip. The digital data pattern is detected by the electro-optic chip, with the digital data pattern conveying some conditional information about the remote optical power supply, such as temperature data or other data. In some embodiments, the intensity of each light signal output by the remote optical power supply is tuned by either adjusting the bias current used to generate the light signal, or by using one or more variable optical attenuator(s) (such as a variable optical attenuator array) to diminish the intensity of some light signal(s) relative to other light signals, or by using one or more optical amplifier(s) (such as a variable optical amplifier array) to increase the intensity of some light signal(s) relative to other light signals.

FIG. 1 shows an example system for unidirectional data communication from a remote optical power supply 101 to an electro-optic chip 103, in accordance with some embodiments. In some embodiments, the remote optical power supply 101 is a WDM laser source that includes a laser array 102 of N lasers 102-1 to 102-N configured to output respective beams of continuous wave laser light, where N is an integer greater than one. In some embodiments, the N different beams of laser light output by the remote optical power supply 101 are different wavelengths λ1 to $\lambda_N$, respectively. In some embodiments, each laser 102-1 to 102-N within the laser array 102 outputs a beam of continuous wave laser light of a different wavelength $\lambda_1$ to $\lambda_N$, respectively, at substantially uniform optical power. For example, the lengths of the arrows as shown in the box 105 represent the relative optical powers of N laser beams having wavelengths $\lambda_1$ to $\lambda_N$, respectively, as output by the lasers 102-1 to 102-N, respectively, of the laser array 102 of the remote optical power supply 101.

A temperature sensor 111 acquires temperature data from the remote optical power supply 101. In some embodiments, the temperature data acquired by the temperature sensor 111 includes separate real-time temperature measurements of each laser 102-1 to 102-N in the laser array 102 of the remote optical power supply 101. The temperature data acquired by the temperature sensor 111 is conveyed to a digital controller 115. The digital controller 115 is configured to direct operation of an optical power adjuster 107 to adjust one or more optical power level(s) of one or more of the N laser beams output by the N lasers 102-1 to 102-N, respectively, of the laser array 102 of the remote optical power supply 101, such that the resulting set of N optical power levels of the N laser beams defines an optical power encoding. The pattern of the N optical power levels across the N laser beams in the optical power encoding conveys information about the temperature of the remote optical power supply 101 as measured by the temperature sensor 111. For example, the lengths of the arrows as shown in the box 109 represent the relative optical powers of N laser beams having wavelengths $\lambda_1$ to $\lambda_N$, respectively, as initially output by the remote optical power supply 101 and subsequently processed by the optical power adjuster 107 to produce the optical power encoding. In the example of FIG. 1, the optical power encoding as represented by the arrows in the box 109 includes an increase in the optical power level of the second laser beam ($\lambda_2$) relative to the other laser beams in the set of N laser beams. By way of example, the pattern of the N optical power levels across the N laser beams in which the optical power level of the second laser beam ($\lambda_2$) is increased relative to the other laser beams in the set of N laser beams defines an optical power encoding that conveys information about the temperature of the remote optical power supply 101 as measured by the temperature sensor 111. It should be understood that any one or more of the optical power levels of the N laser beams as output by the laser array 102 can be adjusted as needed to generate a particular optical power encoding that is associated with a particular temperature condition within the remote optical power supply 101, such that subsequent decoding of the particular optical power encoding conveys the particular temperature condition within the remote optical power supply 101.

In some embodiments, the temperature sensor 111 acquires analog information (temperature data) from the remote optical power supply 101. In some of these embodiments, an optional analog-to-digital converter 113 is implemented to convert the analog information acquired by the temperature sensor 111 into digital levels that are used by the digital controller 115 to direct operation of the optical power adjuster 107 to produce the optical power encoding of the N laser beams that were output by the laser array 102 of the remote optical power supply 101. In some embodiments, the digital controller 115 is configured to output digital control signals to direct operation of the optical power adjuster 107. In some embodiments, the optical power adjuster 107 is configured to operate in accordance with analog control signals. In these embodiments, an optional digital-to-analog converter 117 is implemented to convert the digital control signals as output by the digital controller 115 into corresponding analog control signals in route to the optical power adjuster 107. In some embodiments, the optical power adjuster 107 is configured to operate in accordance with digital control signals. In these embodiments, the digital-to-analog converter 117 is omitted, such that the output of the digital controller 115 is conveyed directly to the control signal input of the optical power adjuster 107.

In some embodiments, bias current(s) of one or more laser(s) 102-1 to 102-N within the laser array 102 of the remote optical power supply 101 are modulated to adjust the optical power of one or more of the N different wavelengths λ1 to λN of laser light to generate the desired optical power encoding. In some embodiments, the optical power adjuster 107 is implemented within the laser array 102 to receive the control information from the digital controller 115 and adjust the bias currents of the lasers 102-1 to 102-N as needed to generate the desired optical power encoding. In some embodiments, the optical power adjuster 107 is implemented separate from the laser array 102. In some of these embodiments, the optical power adjuster 107 includes N optical amplification channels for the N different wavelengths $\lambda_1$ to $\lambda_N$, respectively, of continuous wave laser light output by the laser array 102, where each of the N optical amplification channels includes one or more optical amplifiers. In some of these embodiments, the optical power adjuster 107 includes N optical attenuation channels for the N different wavelengths $\lambda_1$ to $\lambda_N$, respectively, of continuous wave laser light output by the laser array 102, where each of the N optical attenuation channels includes one or more optical attenuators. Also, in some of these embodiments, the optical power adjuster 107 includes both N optical amplification channels and N optical attenuation channels for the N different wavelengths $\lambda_1$ to $\lambda_N$, respectively, of continuous wave laser light output by the laser array 102, where each of the N optical amplification channels includes one or more optical amplifiers, and where each of the N optical attenuation channels includes one or more optical attenuators.

Additionally, in some embodiments, even with the optical power adjuster 107 implemented separate from the laser array 102, the optical power adjuster 107 is implemented to receive the control information from the digital controller 115 and adjust the bias currents of the lasers 102-1 to 102-N as needed to generate the desired optical power encoding. Therefore, it should be understood that in various embodiments, in order to generate the desired optical power encoding, the optical power level of any given one of the N channels corresponding to the N different wavelengths $\lambda_1$ to $\lambda_N$ of continuous wave laser light output by the laser array 102 can be adjusted up or down by adjusting the bias current used to operate the corresponding laser 102-1 to 102-N, or can be adjusted up by operating a corresponding optical amplification channel, or can be adjusted down by operating a corresponding optical attenuation channel.

In some embodiments, the optical power adjuster 107 includes N optical amplification channels for the N different wavelengths $\lambda_1$ to $\lambda_N$, respectively, of continuous wave laser light output by the laser array 102, where each of the N optical amplification channels includes one or more optical amplifiers. In some embodiments, the optical power encoding of the N laser beams is done by increasing the optical power level of any one or more of the N laser beams relative to the normal optical power level of the N laser beams as output by the plurality of lasers 102-1 to 102-N. In some of these embodiments, each of the N laser beams can have one of two power levels, i.e., normal or increased, in the optical power encoding of the N laser beams. This results in $2^N$ possible unique patterns for defining the optical power encoding of the N laser beams. Therefore, in these embodiments, $2^N$ possible unique temperature data values can be conveyed by the optical power encoding of the N laser beams.

In some embodiments, the optical power adjuster 107 includes N optical attenuation channels for the N different wavelengths $\lambda_1$ to $\lambda_N$, respectively, of continuous wave laser light output by the laser array 102, where each of the N optical attenuation channels includes one or more optical attenuators. In some embodiments, the optical power encoding of the N laser beams is done by decreasing the optical power level of any one or more of the N laser beams relative to the normal optical power level of the N laser beams as output by the plurality of lasers 102-1 to 102-N. In some of these embodiments, each of the N laser beams can have one of two power levels, i.e., normal or decreased, in the optical power encoding of the N laser beams. This results in $2^N$ possible unique patterns for defining the optical power encoding of the N laser beams. Therefore, in these embodiments, $2^N$ possible unique temperature data values can be conveyed by the optical power encoding of the N laser beams.

In some embodiments, the optical power adjuster 107 includes both N optical amplification channels and N optical attenuation channels for the N different wavelengths $\lambda_1$ to $\lambda_N$, respectively, of continuous wave laser light output by the laser array 102, where each of the N optical amplification channels includes one or more optical amplifiers, and where each of the N optical attenuation channels includes one or more optical attenuators. In some embodiments, the optical power encoding of the N laser beams is done by either increasing or decreasing the optical power level of any one or more of the N laser beams relative to the normal optical power level of the N laser beams as output by the plurality of lasers 102-1 to 102-N. In some of these embodiments, each of the N laser beams can have one of three power levels, i.e., decreased, normal, or increased, in the optical power encoding of the N laser beams. This results in $3^N$ possible unique patterns for defining the optical power encoding of the N laser beams. Therefore, in these embodiments, $3^N$ possible unique temperature data values can be conveyed by the optical power encoding of the N laser beams.

In some embodiments, the optical power encoding of the N laser beams is done by setting the optical power level of each of the N laser beams to any one of a number P of possible power levels, where P is an integer greater than one. In these embodiments, each of the N laser beams as output by the laser array 102 can have any one of the number P power levels in the optical power encoding of the N laser beams. This results in $P^N$ possible unique patterns of the optical power encoding of the N laser beams. Therefore, in these embodiments, $P^N$ possible unique temperature data values can be conveyed by the optical power encoding of the N laser beams.

The optical power encoding as defined by the encoded/modulated power levels of the different wavelengths $\lambda_1$ to $\lambda_N$ of continuous wave laser light is transmitted from the remote optical power supply 101 through an optical fiber 110 to the electro-optic chip 103. The electro-optic chip 103 includes an optical power detector 119 that receives the different wavelengths $\lambda_1$ to $\lambda_N$ of continuous wave laser light from the optical fiber 110 and determines the optical power level of each of the different wavelengths $\lambda_1$ to $\lambda_N$. The optical power level information for each of the different wavelengths $\lambda_1$ to $\lambda_N$ of continuous wave laser light is conveyed from the optical power detector 119 to a digital controller 121, which is also referred to as a decoder. The digital controller 121 is configured to decode and/or demodulate the optical power levels of the different wavelengths $\lambda_1$ to $\lambda_N$ of continuous wave laser light to determine the optical power encoding that is represented by the received set of N different wavelengths $\lambda_1$ to $\lambda_N$ of continuous wave laser light. The digital controller 121 is further configured to determine the temperature information (analog chip information) about the remote optical power supply 101 that is represented by the decoded optical power encoding. The temperature information that is obtained from the decoded optical power encoding is conveyed to photonic integrated circuitry 127 on the electro-optic chip 103, as indicated by arrow 122. The photonic integrated circuitry 127 uses the temperature information (analog chip information) about the remote optical power supply 101 to adjust operational parameters of ring resonators (ring modulators) on the electro-optic chip 103 to ensure that the different wavelengths $\lambda_1$ to $\lambda_N$ of continuous wave laser light are correctly received and processed by the electro-optic chip 103. For example, in some embodiments, the photonic integrated circuitry 127 uses the temperature information about the various lasers 102-1 to 102-N in the laser array 102 (as obtained from the decoded optical power encoding) to determine corresponding wavelength drifts that have occurred across the N wavelengths $\lambda_1$ to $\lambda_N$ of continuous wave laser light as output by the remote optical power supply 101, and in turn control locking of the resonant wavelengths of ring resonators (ring modulators) onboard the electro-optic chip 103 to adjust for the determined wavelength drifts so that the different wavelengths $\lambda_1$ to $\lambda_N$ of continuous wave laser light are correctly optically coupled into respective ones of the ring resonators (ring modulators).

In some embodiments, the different wavelengths $\lambda_1$ to $\lambda_N$ of continuous wave laser light at their respective optical powers as present in the optical power encoding received at the optical power detector 119 are conveyed directly to the photonic integrated circuitry 127 for optical in-coupling and processing, e.g., modulation. However, in some embodiments, it is desirable for the different wavelengths $\lambda_1$ to $\lambda_N$ of continuous wave laser light to have substantially uniform power levels upon entering the photonic integrated circuitry 127. In these embodiments, the different wavelengths $\lambda_1$ to $\lambda_N$ of continuous wave laser light at their respective optical powers as present in the optical power encoding received at the optical power detector 119 are conveyed to an optical power adjuster 123 onboard the electro-optic chip 103. The optical power adjuster 123 is configured to adjust the optical power levels of one or more of the N different wavelengths $\lambda_1$ to $\lambda_N$ of continuous wave laser light to ensure that the N different wavelengths $\lambda_1$ to $\lambda_N$ of continuous wave laser light have substantially uniform power levels upon entering the photonic integrated circuitry 127. In these embodiments, the optical power adjuster 123 in the electro-optic chip 103 essentially operates to reverse the optical power adjustment that was applied by the optical power adjuster 107 in the remote optical power supply 101. For example, the lengths of the arrows as shown in the box 125 represent the relative optical powers of the N different wavelengths $\lambda_1$ to $\lambda_N$ of continuous wave laser light as output by the optical power adjuster 123. In some embodiments, the optical power encoding that is determined by the digital controller 121 is conveyed as input to the optical power adjuster 123, as indicated by arrow 124, so that the optical power adjuster 123 knows how each of the N different wavelengths $\lambda_1$ to $\lambda_N$ of continuous wave laser light needs to be adjusted to reverse the optical power encoding that was applied by the optical power adjuster 107 within the remote optical power supply 101.

In some embodiments, the optical power detector 119 generates analog information (e.g., optical power levels based on generated photocurrents) from and for the N different wavelengths $\lambda_1$ to $\lambda_N$ of continuous wave laser light that are received from the remote optical power supply 101. In some of these embodiments, an optional analog-to-digital converter 129 is implemented to convert the analog information generated by the optical power detector 119 into digital levels that are used by the digital controller 121. In some embodiments, the digital controller 121 is configured to output digital control signals to direct operation of the optical power adjuster 123. However, in some embodiments, the optical power adjuster 123 is configured to operate in accordance with analog control signals. In these embodiments, an optional digital-to-analog converter 131 is implemented to convert the digital control signals as output by the digital controller 124 into corresponding analog control signals in route to the optical power adjuster 123. In some embodiments, the optical power adjuster 123 is configured to operate in accordance with digital control signals. In these embodiments, the digital-to-analog converter 131 is omitted, such that the output of the digital controller 124 is conveyed directly to the input of the optical power adjuster 123.

As shown in the example embodiment of FIG. 1, digital-to-analog (DAC) conversion is used to encode and/or modulate the power levels of the N different wavelengths $\lambda_1$ to $\lambda_N$ of continuous wave laser light output by the laser array 102 of the remote optical power supply 101 to produce an optical power encoding that conveys relevant operational control information about the remote optical power supply 101, such as temperature information, from the remote optical power supply 101 to the electro-optic chip 103. In this manner, the optical power levels of the N different wavelengths $\lambda_1$ to $\lambda_N$ of continuous wave laser light output by the remote optical power supply 101 provide at least an N-bit signal that is used to communicate data in real-time about the operation of the remote optical power supply 101 that is relevant to proper operation of the electro-optic chip 103.

The optical power encoding, e.g., N-bit DAC signal, encodes the analog temperature information about the laser array 102 and/or other relevant chip information about the remote optical power supply 101 and conveys that information to the electro-optic chip 103 that is optically connected to the remote optical power supply 101. In some embodiments, if the temperature of the laser array 102 is low, the optical power adjuster 107 is operated to apply a higher optical power to one or more of the N different wavelengths $\lambda_1$ to $\lambda_N$ of continuous wave laser light as output by the laser array 102 in order to generate the optical power encoding, e.g., the N-bit DAC signal. The electro-optic chip 103 is configured to determine the optical power of each separate one of the N different wavelengths $\lambda_1$ to $\lambda_N$ of continuous wave laser light that are received from the remote optical power supply 101. The electro-optic chip 103 is configured to determine which of the N different wavelengths $\lambda_1$ to $\lambda_N$ of received laser light is/are at higher optical power during locking of the resonant wavelengths of the ring resonators (ring modulators) within the electro-optic chip 103. In some embodiments, a set of remaining ring resonators (the ring resonators/modulators that do not correspond to the wavelengths of received laser light at higher optical power) have their resonant wavelengths controlled/set with an appropriate amount of tuning power that leaves room for resonant wavelength adjustment in case the temperature of the laser array 102 in the remote optical power supply 101 changes, e.g., increases. Similarly, in some embodiments, if the optical power encoding (N-bit DAC signal) conveys that the temperature of the laser array 102 in the remote optical power supply 101 is high, a set of ring resonators (ring modulators) within the electro-optic chip 103 have their resonant wavelengths controlled/set with higher tuning power to account for the decreasing temperature drift of the laser array 102 within the remote optical power supply 101.

In an example embodiment, the remote optical power supply 101 includes the laser array 102 that includes the plurality of lasers 102-1 to 102-N, where each of the plurality of lasers 102-1 to 102-N is configured to generate a separate beam of continuous wave laser light. In this example embodiment, the temperature sensor 111 is configured to acquire a temperature associated with the laser array 102. In this example embodiment, the digital controller 115 is configured to receive notification of the temperature from the temperature senor 111. In this example embodiment, the optical power adjuster 107 is controlled by the digital controller 115. The optical power adjuster 107 is configured to adjust an optical power level of one or more beams of continuous wave laser light generated by the plurality of lasers 102-1 to 102-N to produce an optical power encoding that conveys information about the temperature associated with the laser array 102 as acquired by the temperature sensor 111.

In some embodiments, the temperature associated with the laser array 102 includes a temperature of each of the plurality of lasers 102-1 to 102-N, and the optical power encoding conveys information about the temperature of each of the plurality of lasers 102-1 to 102-N. In some embodiments, the temperature associated with the laser array 102 is acquired in real-time, and the digital controller 115 is configured to direct operation of the optical power adjuster 107 to generate the optical power encoding in real-time. In some embodiments, the optical power adjuster 107 is configured to adjust one or more bias currents respectively supplied to one or more of the plurality of lasers 102-1 to 102-N in accordance with control signals received from the digital controller 115. In some embodiments, the optical power adjuster 107 is configured to amplify one or more of the separate beams of continuous wave laser light generated by the plurality of lasers 102-1 to 102-N in accordance with control signals received from the digital controller 115. In some embodiments, the optical power adjuster 107 is configured to attenuate one or more of the separate beams of continuous wave laser light generated by the plurality of lasers 102-1 to 102-N in accordance with control signals received from the digital controller 115. In some embodiments, the optical power adjuster 107 is configured to amplify or attenuate one or more of the separate beams of continuous wave laser light generated by the plurality of lasers 102-1 to 102-N in accordance with control signals received from the digital controller 115. In some embodiments, the remote optical power supply 101 includes both the analog-to-digital converter 113 configured to convert the temperature acquired by the temperature sensor 111 from an analog signal to a digital signal in route to the digital controller 115, and the digital-to-analog converter 117 configured to convert digital signals output by the digital controller 115 to analog signals in route to the optical power adjuster 107.

In an example embodiment, an optical data communication system includes the remote optical power supply 101 and the electro-optic chip 103. The remote optical power supply 101 is configured to generate and output a plurality of continuous wave laser light beams. The remote optical power supply 101 is configured to impart an optical power encoding across the plurality of continuous wave laser light beams, where the optical power encoding conveys information about the remote optical power supply 101. The electro-optic chip 103 is optically connected to receive the plurality of continuous wave laser light beams having the optical power encoding as output by the remote optical power supply 101. The electro-optic chip 103 is configured to decode the optical power encoding to obtain the information about the remote optical power supply 101 as conveyed in the optical power encoding. The electro-optic chip 103 is configured to use the plurality of continuous wave laser light beams as source light for generation of modulated optical signals.

In some embodiments, the optical power encoding conveys information about a real-time temperature of the remote optical power supply 101. In some embodiments, the electro-optic chip 103 is configured to use the real-time temperature of the remote optical power supply 101 as obtained from the optical power encoding to respectively control one or more resonant wavelengths of one or more ring resonators to facilitate respective in-coupling of one or more of the plurality of continuous wave laser light beams into the one or more ring resonators. In some embodiments, the remote optical power supply 101 includes the plurality of lasers 102-1 to 102-N and one or more temperature sensors 111 that respectively measure one or more real-time temperatures of the plurality of lasers 102-1 to 102-N. In some embodiments, the remote optical power supply 101 includes the optical power adjuster 107 configured to adjust an optical power of one or more of the plurality of continuous wave laser light beams so as to impart the optical power encoding across the plurality of continuous wave laser light beams. In some embodiments, the optical power adjuster 107 is configured to adjust a bias current applied to one or more of the plurality of lasers 102-1 to 102-N, or amplify an optical power of one or more of the plurality of continuous wave laser light beams, or attenuate the optical power of one or more of the plurality of continuous wave laser light beams. In some embodiments, the electro-optic chip 103 includes the optical power adjuster 123 configured to reverse the optical power encoding imparted across the plurality of continuous wave laser light beams, such that the plurality of continuous wave laser light beams are of substantially uniform optical power prior to use as source light for generation of modulated optical signals for optical data communication purposes.

Figure 2A:
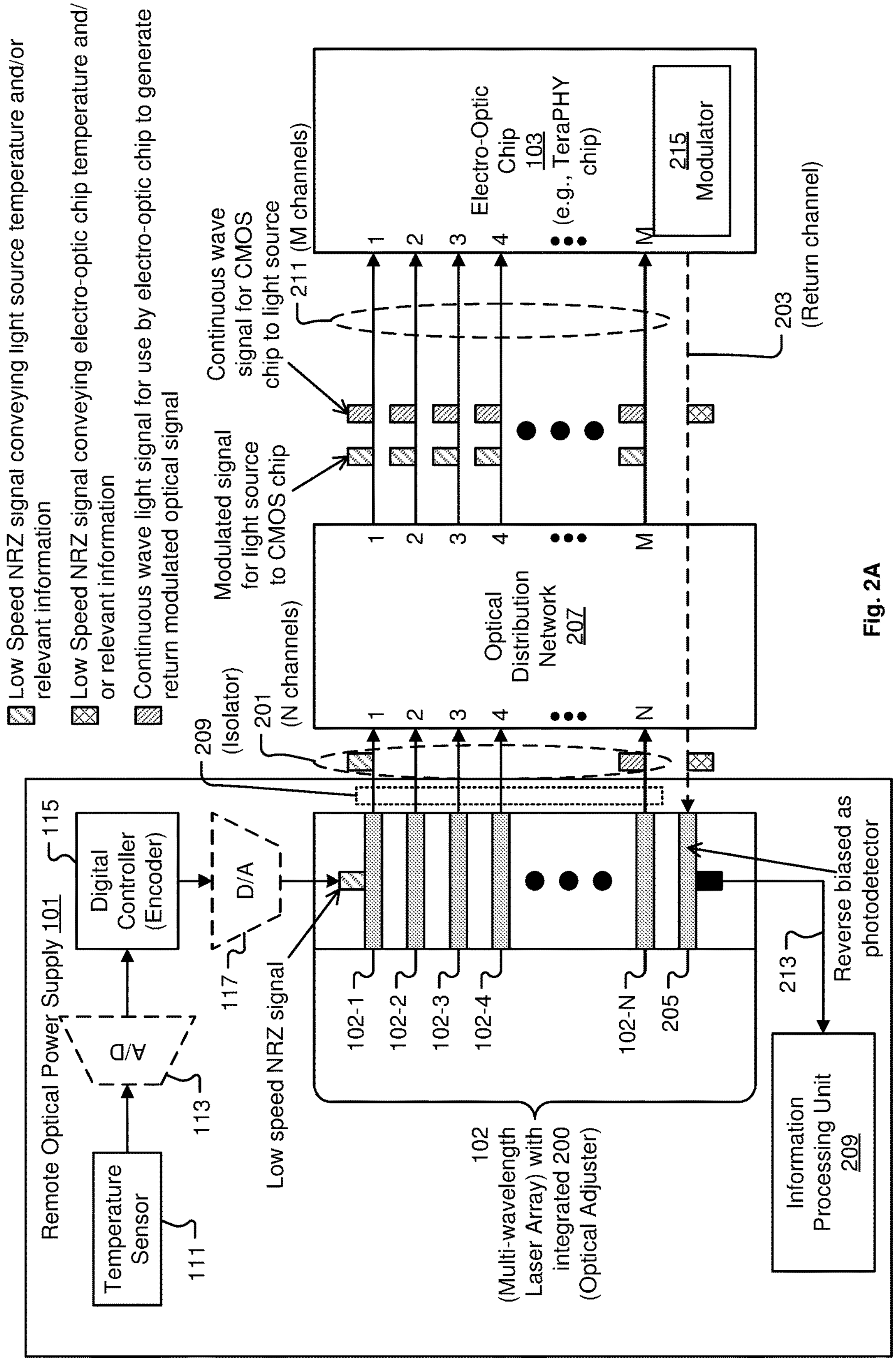
FIG. 2A shows an example system for bidirectional data communication between the remote optical power supply and electro-optic chip, in accordance with some embodiments.

FIG. 2A shows an example system for bidirectional data communication between the remote optical power supply 101 and electro-optic chip 103, in accordance with some embodiments. In some embodiments, the lasers 102-1 to 102-N within the laser array 102 within the WDM laser source (remote optical power supply 101) output continuous wave laser light. In the example of FIG. 2A, an optical adjuster 200 is integrated with the laser array 102. The optical adjuster 200 is configured to adjust one or more of the beams of continuous wave laser light as output by the N lasers 102-1 to 102-N to impart an optical encoding across the set of N beams of continuous wave laser light as output by the N lasers 102-1 to 102-N. In some embodiments, for bidirectional data communication between the remote optical power supply 101 and electro-optic chip 103, the optical adjuster 200 operates to apply either low speed intensity or phase modulation to one of the laser array 102 channels within the remote optical power supply 101 for detection by the receiver side at the electro-optic chip 103. For example, the temperature sensor 111 collects chip information (analog information), such as temperature data for the remote optical power supply 101 (e.g., for each of the lasers 102-1 to 102-N), and converts this analog chip information into digital levels that are used to modulate the beam of continuous wave laser light generated by the laser 102-1 with a low speed non-return-to-zero (NRZ) signal.

The system of FIG. 2A includes an optical distribution network 207 that is configured to receive the N channels 201 of light from the remote optical power supply 101 at N respective optical inputs of the optical distribution network 207. The optical distribution network 207 is configured to convey each of the N different wavelengths $\lambda_1$ to $\lambda_N$ of light received on the N input channels 201 from the remote optical power supply 101 to each of M output channels 211 of the optical distribution network 207. In this manner, a portion of each of the N different wavelengths $\lambda_1$ to $\lambda_N$ of light received on the N input channels 201 from the remote optical power supply 101 is transmitted on each of the M output channels 211 of the optical distribution network 207. The electro-optic chip 103 has one or more optical inputs optically connected to receive the light conveyed through respective ones of the M output channels 211 of the optical distribution network 207. For example, FIG. 2A shows the electro-optic chip 103 as having M optical inputs optically connected to receive light conveyed through respective ones of the M output channels 211 of the optical distribution network 207, respectively. All of the N different wavelengths $\lambda_1$ to $\lambda_N$ of light as output by the remote optical power supply 101 are received at each of the optical inputs of the electro-optic chip 103. In some embodiments, the remote optical power supply 101 and the optical distribution network 207 are used to service multiple electro-optic chips 103. In these embodiments, a subset of the M output channels 211 is optically connected to the optical inputs of each electro-optic chip 103.

In some embodiments, optical fibers are used to convey light through the N channels from the remote optical power supply 101 to the optical distribution network 207. In some embodiments, the optical distribution network 207 is integrated into the remote optical power supply 101, such that optical waveguides integrated within the remote optical power supply 101 are used to convey light from the laser array 102 to the optical distribution network 207. In some embodiments, optical fibers are used to convey light through the M output channels 211 from the optical distribution network 207 to the electro-optic chip 103. In some embodiments, the optical distribution network 207 is integrated into the electro-optic chip 103, such that optical waveguides integrated within the electro-optic chip 103 are used to convey light from the optical distribution network 207 to photonic circuitry within the electro-optic chip 103.

In some embodiments, one of the N lasers 102-1 to 102-N is operated to supply a continuous wave laser light signal at a particular wavelength for use by the electro-optic chip 103 in generating a modulated light signal that is sent back to the remote optical power supply 101 from the electro-optic chip 103 to convey information. For example, in FIG. 2A, the continuous wave laser light generated by the laser 102-N is supplied as source light to a modulator 215 onboard the electro-optic chip 103. The modulator 215 is configured to modulate the continuous wave light source light to generate a modulated optical signal that conveys information from the electro-optic chip 103 to the remote optical power supply 101. A return channel 203 is established between the electro-optic chip 103 and the remote optical power supply 101 for conveyance of the modulated signal from the electro-optic chip 103 to the remote optical power supply 101. In some embodiments, the return channel 203 passes through the optical distribution network 207. In some embodiments, the return channel 203 is a formed by a separate optical fiber connection between the electro-optic chip 103 and the remote optical power supply 101.

In some embodiments, the laser array 102 includes a dummy laser 205 that is reverse biased to function as a photodetector for optical signal detection. The photodetector defined by the reverse-biased dummy laser 205 receives and detects the modulated light signal that is conveyed through the return channel 203 from the electro-optic chip 103 to the remote optical power supply 101. In some embodiments, the remote optical power supply 101 includes an information processing unit 209 that is connected to receive photocurrent generated by the photodetector of the reverse-biased dummy laser 205, as indicated by arrow 213. The information processing unit 209 is configured to demodulate this return signal received through the return channel 203 to obtain the conveyed information encoded therein. Also, in some embodiments, an optical isolator 209 is implemented within the remote optical power supply 101 to prevent the modulated light signal that is sent from the electro-optic chip 103 to the remote optical power supply 101 through the return channel 203 from interfering with operation of the lasers 102-1 to 102-N.

Figure 2B:
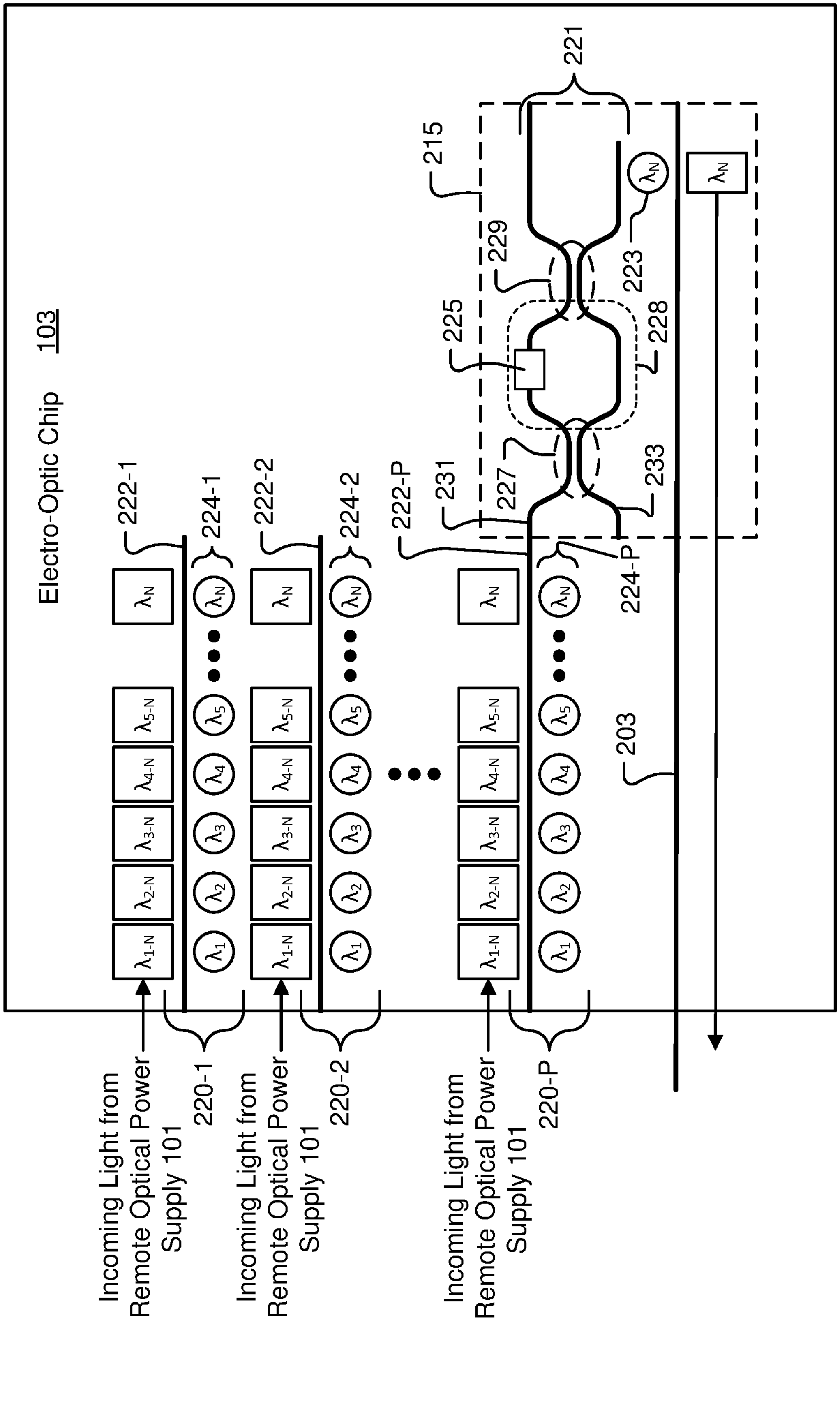
FIG. 2B shows an example of the modulator within the electro-optical chip for modulating the continuous wave laser light signal received from the remote optical power supply to generate the return modulated light signal that is conveyed through the return channel, in accordance with some embodiments.

FIG. 2B shows an example of the modulator 215 within the electro-optical chip 103 for modulating the continuous wave laser light signal received from the remote optical power supply 101 to generate the return modulated light signal that is conveyed through the return channel 203, in accordance with some embodiments. In some embodiments, the electro-optic chip 103 includes a plurality of input channels 220-1 to 220-P. In some embodiments, each of the input channels 220-1 to 220-P includes an optical waveguide 222-1 to 222-P, respectively, through which light from the remote optical power supply 101 is conveyed. Each of the input channels 220-1 to 220-P includes a set of N of ring resonators 224-1 to 224-P. Each ring resonator in each set of N ring resonators 224-1 to 224-P has its resonant wavelength tuned to one of the N different wavelengths $\lambda_1$ to $\lambda_N$ of the incoming light from the remote optical power supply 101. In some embodiments, as the light of a given wavelength $\lambda_x$ passes by the ring resonator tuned to the given wavelength $\lambda_x$ in the set of N of ring resonators 224-1 to 224-P, the light of the given wavelength $\lambda_x$ is substantially in-coupled into the ring resonator that is tuned to the given wavelength $\lambda_x$.

In some embodiments, the set of N of ring resonators 224-1 to 224-P in the input channel 220-P that is optically connected to the modulator 215 are controlled to allow a particular wavelength of the incoming light to travel into the modulator 215. In the example of FIG. 2B, the wavelength $\lambda_N$ of incoming light is allowed to travel into the modulator 215. In some embodiments, the modulator 215 includes a cross-arm optical waveguide configuration 221 that includes a first optical waveguide 231 on which the incoming continuous wave light is received and a second optical waveguide 233 that runs along with the first optical waveguide 231. The first optical waveguide 231 and the second optical waveguide 233 are formed to approach each other to create a first adiabatic coupling region 227 between the first optical waveguide 231 and the second optical waveguide 233. The first adiabatic coupling region 227 causes a portion of the incoming light to couple into the second optical waveguide 233, with a remaining portion of the incoming light continuing on through the first optical waveguide 231. After the first adiabatic coupling region 227, the first optical waveguide 231 and the second optical waveguide 233 extend away from each other over a phase-shifting region 228. A phase shifter 225 is implemented along the first optical waveguide 231 and is configured to impart controlled phase modulation onto the light signal traveling through the first optical waveguide 231 within the phase-shifting region 228 to generate a modulated light signal that continues on in the first optical waveguide 231. After the phase-shifting region 228, the first optical waveguide 231 and the second optical waveguide 233 approach each other again to create a second adiabatic coupling region 229. In the second adiabatic coupling region 229, the modulated light signal conveyed through the first optical waveguide 231 from the phase-shifting region 228 is coupled into the second optical waveguide 233, such that the modulated light signal is combined with the unmodulated portion of the original incoming light signal that had continued on through the second optical waveguide 233 from the first adiabatic coupling region 228 to create the return signal. In some embodiments, the modulator 215 includes a ring resonator 223 that is tuned to the wavelength of the light of the return signal to provide for optical transfer of the return signal from the second optical waveguide 233 to the return channel 203. In some embodiments, the portion of the return channel within the electro-optic chip 103 is formed as an optical waveguide, which is optically connected to an optical fiber at an output optical port of the electro-optic chip 103.

The modulated optical return signal conveys information that is to be communicated from the electro-optic chip 103 to the remote optical power supply 101. As previously mentioned, in some embodiments, the modulated optical return signal is transmitted from the electro-optic chip 103 to the remote optical power supply 101 using an extra optical fiber coupled to a photodetector in the remote optical power supply 101. In some embodiments, this photodetector in the remote optical power supply 101 is a laser that has been reversed biased to operate as a photodetector.

In some embodiments, the laser array 102 includes multiple (N>1) wavelength channels, e.g., N=8 or more, with each wavelength channel corresponding to a respective one of the lasers 102-1 to 102-N. Also, in some embodiments, the laser array 102 includes at least one dummy laser channel, e.g., dummy laser 205 channel, for optical alignment purposes. More specifically, the laser beam output by the dummy laser 205 channel is used for active optical alignment of the remote optical power supply 101 to an external optical device, such as to the optical distribution network 207 or to another electro-optic or photonic device. In some embodiments, detection of the laser beam output by the dummy laser 205 channel by photonics within the external device indicates proper optical alignment of the remote optical power supply 101 with the external device. In some embodiments, the dummy laser 205 channel used for active optical alignment purposes is also used as a photodetector channel by reverse biasing the dummy laser 205 to function as a photodetector. In this manner, the dummy laser 205 channel for active optical alignment purposes is converted into an optical detection (photodetector) channel to enable bidirectional data communication between the remote optical power supply 101 and the electro-optic chip 103.

In some embodiments, at startup of the system as shown in FIGS. 2A and 2B, light conveyed through one of the N wavelength $\lambda_1$ to $\lambda_N$ channels 201 is modulated with a low speed NRZ optical signal or phase modulated optical signal. In some embodiments, the system as shown in FIGS. 2A and 2B is used where there is no requirement for high-speed designs to save cost. The low speed NRZ optical signal or phase modulated optical signal includes/conveys temperature information or relevant chip information about the remote optical power supply 101 for transmission from the remote optical power supply 101 to the electro-optic chip 103. Another one of the lasers 102-1 to 102-N in the laser array 102 operates in continuous wave mode to generate and transmit the continuous wave laser light signal of a particular wavelength AR for use by the modulator 215 within the electro-optic chip 103 for generating the modulated optical return signal. Once the electro-optic chip 103 has some return information to provide to the remote optical power supply 101, the modulator 215 within the electro-optic chip 103 operates to modulate the continuous wave laser light signal received on the particular wavelength $\lambda_R$ channel to generate the modulated optical return signal that includes/conveys the return information. The modulated optical return signal is transmitted from the electro-optic chip 103 to the reverse biased dummy laser 205 functioning as the photodetector within the remote optical power supply 101. The optical isolator 209 within the remote optical power supply 101 effectively blocks the modulated optical return signal from entering any of the lasers 102-1 to 102-N of the laser array 102, such that the modulated optical return signal only enters the reverse biased dummy laser 205 functioning as the photodetector.

Figure 3:
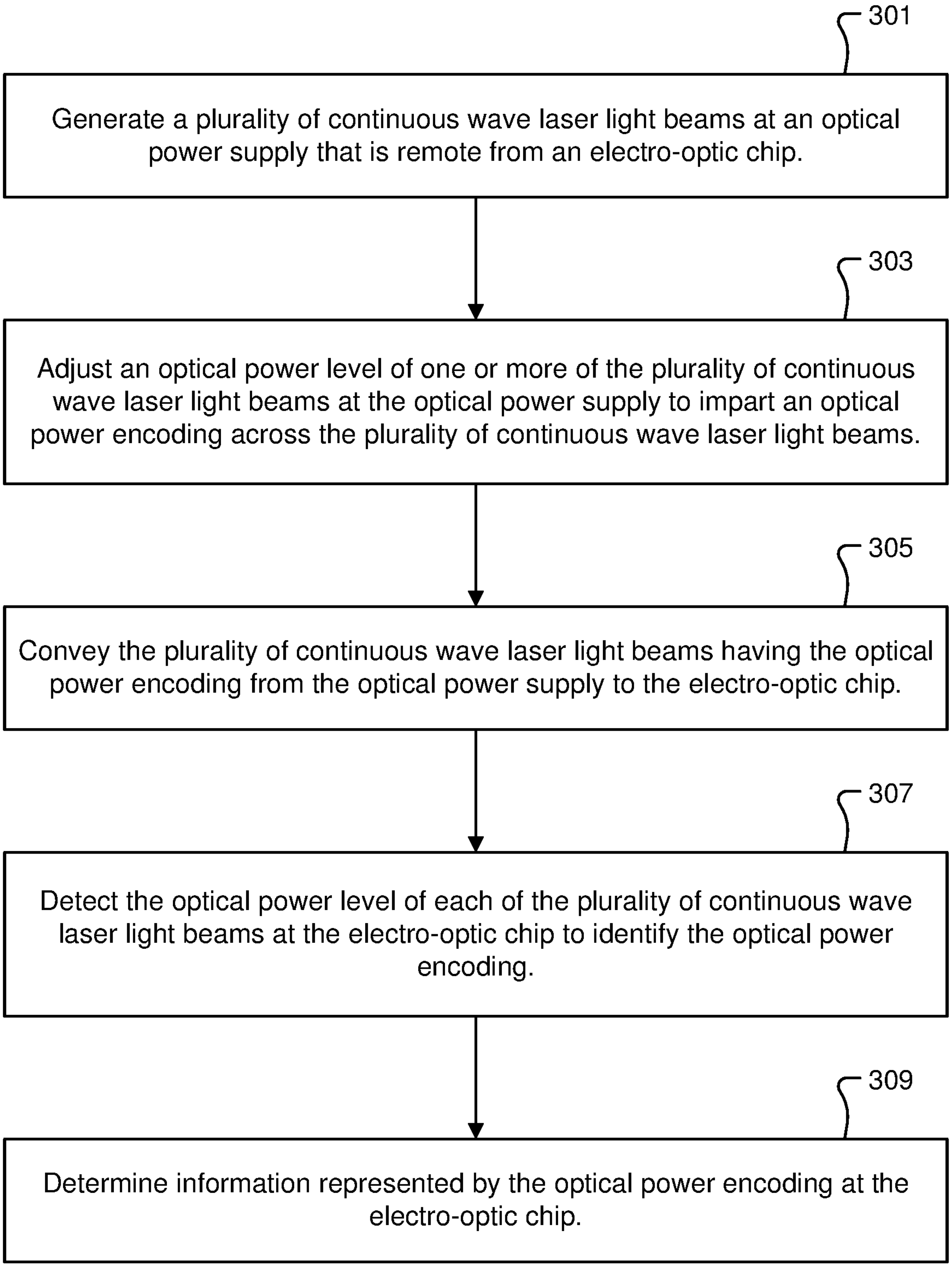
FIG. 3 shows a flowchart of a method for data communication between the remote optical power supply and an electro-optic chip, in accordance with some embodiments.

FIG. 3 shows a flowchart of a method for data communication between the remote optical power supply 101 and an electro-optic chip 103, in accordance with some embodiments. The method includes an operation 301 for generating a plurality of continuous wave laser light beams at the optical power supply 101 that is remote from the electro-optic chip 103. The method also includes an operation 303 for adjusting an optical power level of one or more of the plurality of continuous wave laser light beams at the remote optical power supply 101 to impart an optical power encoding across the plurality of continuous wave laser light beams. The method also includes an operation 305 for conveying the plurality of continuous wave laser light beams having the optical power encoding from the remote optical power supply 101 to the electro-optic chip 103. The method also includes an operation 307 for detecting the optical power level of each of the plurality of continuous wave laser light beams at the electro-optic chip 103 to identify the optical power encoding. The method also includes an operation 309 for determining information represented by the optical power encoding at the electro-optic chip 103.

In some embodiments, the plurality of continuous wave laser light beams are generated in the operation 301 by respective ones of the plurality of lasers 102-1 to 102-N. In some embodiments, adjusting the optical power level of one or more of the plurality of continuous wave laser light beams in the operation 303 is done by adjusting a bias current applied to respective ones of the plurality of lasers 102-1 to 102-N. In some embodiments, adjusting the optical power level of one or more of the plurality of continuous wave laser light beams in the operation 303 is done by amplifying an optical power level of one or more of the plurality of continuous wave laser light beams. In some embodiments, adjusting the optical power level of one or more of the plurality of continuous wave laser light beams in the operation 303 is done by attenuating an optical power level of one or more of the plurality of continuous wave laser light beams.

In some embodiments, the method includes an operation for measuring a temperature associated with operation of the remote optical power supply 101, where the temperature is represented by the optical power encoding. In some embodiments, the method includes an operation for adjusting a resonant wavelength of a ring resonator at the electro-optic chip 103 based on the temperature associated with operation of the remote optical power supply 101 as represented by the optical power encoding, where the resonant wavelength affects in-coupling of one of the plurality of continuous wave laser light beams into the ring resonator. In some embodiments, the method includes an operation for reversing the optical power encoding imparted across the plurality of continuous wave laser light beams prior to using the plurality of continuous wave laser light beams as source light for generating modulated optical signals for optical data communication purposes, where reversing the optical power encoding is done by the electro-optic chip 103.

Figure 4:
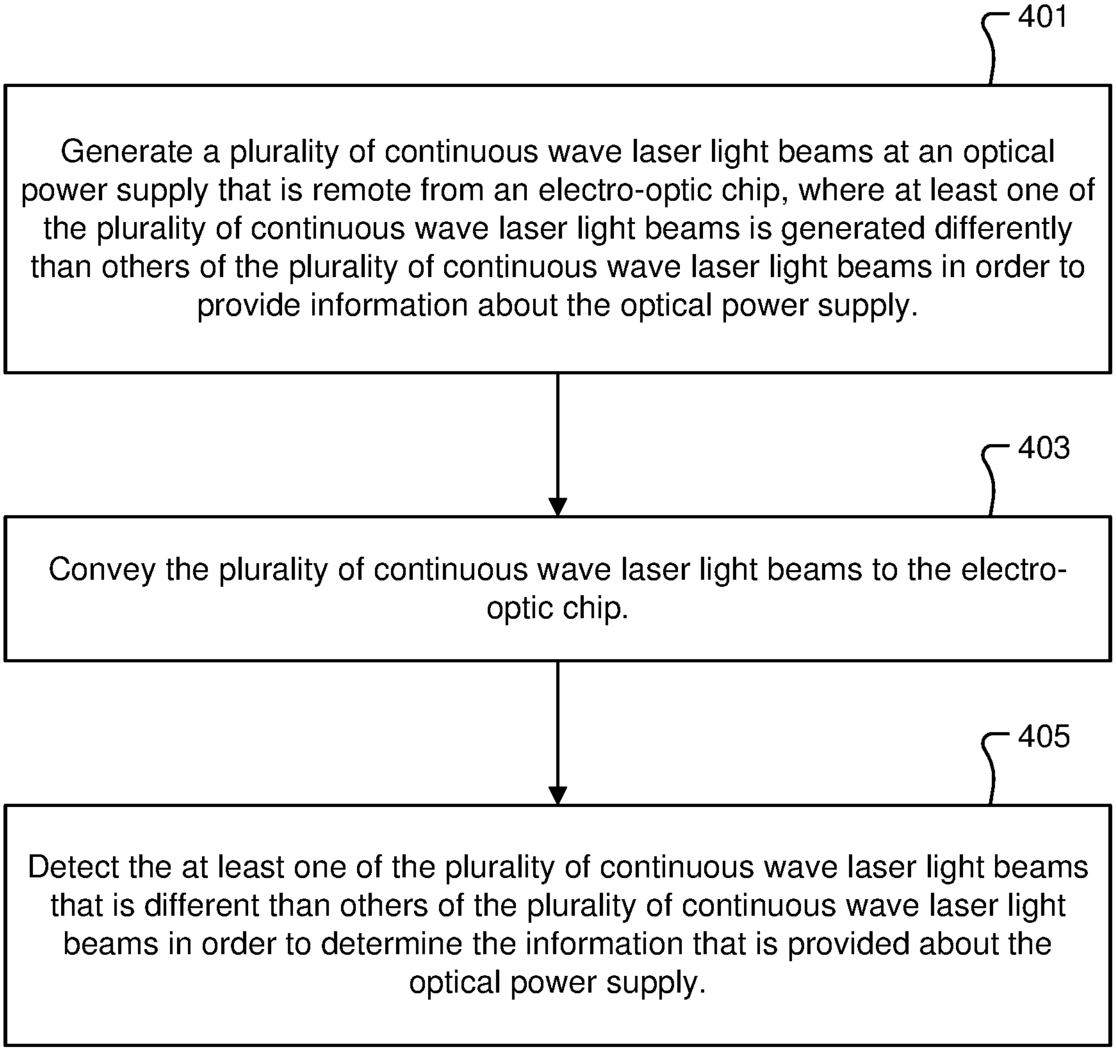
FIG. 4 shows a flowchart of a method for data communication between the remote optical power supply and the electro-optic chip, in accordance with some embodiments.

FIG. 4 shows a flowchart of a method for data communication between the remote optical power supply 101 and the electro-optic chip 103, in accordance with some embodiments. The method includes an operation 401 for generating a plurality of continuous wave laser light beams at the remote optical power supply 101 that is remote from the electro-optic chip 103. At least one of the plurality of continuous wave laser light beams is generated differently than others of the plurality of continuous wave laser light beams in order to provide information about the remote optical power supply 101. The method also includes an operation 403 for conveying the plurality of continuous wave laser light beams to the electro-optic chip 103. The method also includes an operation 405 for detecting the at least one of the plurality of continuous wave laser light beams that is different than others of the plurality of continuous wave laser light beams in order to determine the information that is provided about the remote optical power supply 101.

In some embodiments, at least one of the plurality of continuous wave laser light beams is generated as a low speed non-return-to-zero (NRZ) signal that is different than others of the plurality of continuous wave laser light beams. The low speed NRZ signal provides information about the remote optical power supply 101. In some embodiments, the method includes an operation for using the information that is provided about the remote optical power supply 101 to control operation of a plurality of ring resonators on the electro-optic chip 103 to facilitate in-coupling of the plurality of continuous wave laser light beams into respective ones of the plurality of ring resonators. In some embodiments, information about the temperature of the remote optical power supply 101 is provided by the differently generated one of the plurality of continuous wave laser light beams in the operation 401.

It should be understood that because the real-time temperature information about the laser array 102 (and even about individual lasers 102-1 to 102-N within the laser array 102) can be conveyed from the remote optical power supply 101 to the electro-optic chip 103 in real-time using the various methods disclosed herein, it is possible for the layer array 102 to operate under varying temperature conditions. The electro-optic chip 103 is able to adjust the resonant wavelengths of the ring resonators with the various receiver channels of the electro-optic chip 103 as needed to accommodate drift in the wavelength(s) of the incoming laser beams due to changes in temperature of the corresponding laser(s) 102-1 to 102-N within the laser array 102 of the remote optical power supply 101. Therefore, in some embodiments, the systems and method disclosed herein for conveying real-time temperature information from the remote optical power supply 101 to the electro-optic chip 103 provides for operation of the laser array 102 in an uncooled manner, e.g., with uncooled WDM optical links. In these embodiments, by not having to provide for active cooling of the lasers 102-1 to 102-N in the laser array 102, the remote optical power supply 101 can be implemented in a less complex manner, which provides for corresponding savings in cost and energy consumption. Also, even with active cooling of the lasers 102-1 to 102-N in the laser array 102, the real-time communication of temperature information between the remote optical power supply 101 and the electro-optic chip 103 provides for improved tracking of and compensation for any drift in the wavelengths of the lasers 102-1 to 102-N by the electro-optic chip 103. Additionally, while the various embodiments disclosed herein have been focused on communication of temperature data between the remote optical power supply 101 and the electro-optic chip 103, it should be understood that the systems and methods disclosed herein can be used to communicate essentially any type of data from the remote optical power supply 101 to the electro-optic chip 103, and vice-versa.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An optical power supply, comprising:

a laser array including a number N of lasers, wherein N is greater than one, wherein each of the number N of lasers is configured to generate a separate one of N laser beams of continuous wave laser light having a different one of multiple different wavelengths, wherein each of the number N of lasers is configured to operate at any specified one of a number P of power levels at a given time, wherein P is greater than one, wherein a pattern of respective power levels of the N laser beams of continuous wave laser light generated by the N lasers at a given time defines an optical power encoding at the given time, wherein the laser array is configured as controllable to generate any one of $P^N$ possible unique optical power encodings of the N laser beams of continuous wave laser light at any given time; and an optical power adjuster configured to control each of the N power levels of the N lasers to produce a particular optical power encoding of the $P^N$ possible optical power encodings of the N laser beams of continuous wave laser light at a particular time, wherein the particular optical power encoding conveys information about operational control of the optical power supply at the particular time.

2. The optical power supply as recited in claim 1, wherein the particular optical power encoding conveys information about a temperature associated with the laser array.

3. The optical power supply as recited in claim 2, further comprising:

a number N of temperature sensors configured and disposed to measure respective temperatures of the N lasers of the laser array; and a digital controller configured to receive the measured temperatures of the N lasers of the laser array from the N temperature sensors, wherein the digital controller is configured to direct operation of the optical power adjuster to generate the particular optical power encoding that conveys information about the temperature associated with the laser array.

4. The optical power supply as recited in claim 3, wherein the optical power adjuster is configured to adjust bias currents respectively supplied to the N lasers in accordance with control signals received from the digital controller.

5. The optical power supply as recited in claim 3, wherein the optical power adjuster is configured to amplify any one or more of the N laser beams of continuous wave laser light respectively generated by the N lasers to have a higher one of the P power levels in accordance with control signals received from the digital controller.

6. The optical power supply as recited in claim 3, wherein the optical power adjuster is configured to attenuate any one or more of the N laser beams of continuous wave laser light respectively generated by the N lasers to have a lower one of the P power levels in accordance with control signals received from the digital controller.

7. The optical power supply as recited in claim 1, wherein the the number P of power levels is either two or three.

8. The optical power supply as recited in claim 3, further comprising:

an analog-to-digital converter configured to convert the temperatures measured by the N temperature sensors from respective analog signals to respective digital signals in route to the digital controller; and a digital-to-analog converter configured to convert digital signals output by the digital controller to analog signals in route to the optical power adjuster.

9. An optical data communication system, comprising:

an optical power supply configured to generate and output a plurality of continuous wave laser light beams, the optical power supply configured to impart an optical power encoding across the plurality of continuous wave laser light beams, wherein the optical power encoding conveys information about the optical power supply; and an electro-optic chip optically connected to receive the plurality of continuous wave laser light beams having the optical power encoding as output by the optical power supply, the electro-optic chip configured to decode the optical power encoding to obtain the information about the optical power supply as conveyed in the optical power encoding, the electro-optic chip configured to use the plurality of continuous wave laser light beams as source light for generation of modulated optical signals.

10. The optical data communication system as recited in claim 9, wherein the optical power encoding conveys information about a real-time temperature of the optical power supply, and wherein the electro-optic chip is configured to use the real-time temperature of the optical power supply as obtained from the optical power encoding to respectively control one or more resonant wavelengths of one or more ring resonators to facilitate respective in-coupling of one or more of the plurality of continuous wave laser light beams into the one or more ring resonators.

11. The optical data communication system as recited in claim 10, wherein optical power supply includes a plurality of lasers, and wherein the optical power supply includes one or more temperature sensors that respectively measure one or more real-time temperatures of the plurality of lasers.

12. The optical data communication system as recited in claim 11, wherein the optical power supply includes an optical power adjuster configured to adjust an optical power of one or more of the plurality of continuous wave laser light beams so as to impart the optical power encoding across the plurality of continuous wave laser light beams.

13. The optical data communication system as recited in claim 12, wherein the optical power adjuster is configured to adjust a bias current applied to one or more of the plurality of lasers, or amplify an optical power of one or more of the plurality of continuous wave laser light beams, or attenuate the optical power of one or more of the plurality of continuous wave laser light beams.

14. The optical data communication system as recited in claim 9, wherein the electro-optic chip includes an optical power adjuster configured to reverse the optical power encoding imparted across the plurality of continuous wave laser light beams such that the plurality of continuous wave laser light beams are of substantially uniform optical power prior to use as source light for generation of modulated optical signals.

15. A method for data communication between an optical power supply and an electro-optic chip, comprising:

generating a plurality of continuous wave laser light beams at an optical power supply that is remote from an electro-optic chip;

adjusting an optical power level of one or more of the plurality of continuous wave laser light beams at the optical power supply to impart an optical power encoding across the plurality of continuous wave laser light beams;

conveying the plurality of continuous wave laser light beams having the optical power encoding from the optical power supply to the electro-optic chip;

detecting the optical power level of each of the plurality of continuous wave laser light beams at the electro-optic chip to identify the optical power encoding;

determining information represented by the optical power encoding at the electro-optic chip;

measuring a temperature associated with operation of the optical power supply, wherein the temperature is represented by the optical power encoding; and adjusting a resonant wavelength of a ring resonator at the electro-optic chip based on the temperature associated with operation of the optical power supply as represented by the optical power encoding, wherein the resonant wavelength affects in-coupling of one of the plurality of continuous wave laser light beams into the ring resonator.

16. The method as recited in claim 15, wherein the plurality of continuous wave laser light beams are generated by respective ones of a plurality of lasers, and wherein said adjusting the optical power level of one or more of the plurality of continuous wave laser light beams is done by adjusting a bias current applied to respective ones of the plurality of lasers.

17. The method as recited in claim 15, wherein said adjusting the optical power level of one or more of the plurality of continuous wave laser light beams is done by amplifying an optical power level of one or more of the plurality of continuous wave laser light beams.

18. The method as recited in claim 15, wherein said adjusting the optical power level of one or more of the plurality of continuous wave laser light beams is done by attenuating an optical power level of one or more of the plurality of continuous wave laser light beams.

19. A method for data communication between an optical power supply and an electro-optic chip, comprising:

generating a plurality of continuous wave laser light beams at an optical power supply that is remote from an electro-optic chip;

adjusting an optical power level of one or more of the plurality of continuous wave laser light beams at the optical power supply to impart an optical power encoding across the plurality of continuous wave laser light beams;

conveying the plurality of continuous wave laser light beams having the optical power encoding from the optical power supply to the electro-optic chip;

detecting the optical power level of each of the plurality of continuous wave laser light beams at the electro-optic chip to identify the optical power encoding;

determining information represented by the optical power encoding at the electro-optic chip; and reversing the optical power encoding imparted across the plurality of continuous wave laser light beams prior to using the plurality of continuous wave laser light beams as source light for generating modulated optical signals, wherein reversing the optical power encoding is done by the electro-optic chip.

20. A method for data communication between an optical power supply and an electro-optic chip, comprising:

generating a plurality of continuous wave laser light beams at an optical power supply that is remote from an electro-optic chip, wherein at least one of the plurality of continuous wave laser light beams is generated differently than others of the plurality of continuous wave laser light beams in order to provide information about the optical power supply;

conveying the plurality of continuous wave laser light beams to the electro-optic chip; and detecting the at least one of the plurality of continuous wave laser light beams that is different than others of the plurality of continuous wave laser light beams in order to determine the information that is provided about the optical power supply.

21. The method as recited in claim 20, wherein at least one of the plurality of continuous wave laser light beams is generated as a low speed non-return-to-zero signal that is different than others of the plurality of continuous wave laser light beams, the low speed non-return-to-zero signal providing information about the optical power supply.

22. The method as recited in claim 20, further comprising:

using the information that is provided about the optical power supply to control operation of a plurality of ring resonators on the electro-optic chip to facilitate in-coupling of the plurality of continuous wave laser light beams into respective ones of the plurality of ring resonators.

23. The method as recited in claim 22, wherein the information that is provided about the optical power supply is temperature information.

24. The method as recited in claim 19, wherein the plurality of continuous wave laser light beams are generated by respective ones of a plurality of lasers, and wherein said adjusting the optical power level of one or more of the plurality of continuous wave laser light beams is done by adjusting a bias current applied to respective ones of the plurality of lasers.

25. The method as recited in claim 19, wherein said adjusting the optical power level of one or more of the plurality of continuous wave laser light beams is done by amplifying an optical power level of one or more of the plurality of continuous wave laser light beams.

26. The method as recited in claim 19, wherein said adjusting the optical power level of one or more of the plurality of continuous wave laser light beams is done by attenuating an optical power level of one or more of the plurality of continuous wave laser light beams.

* * * * *